United States Patent [19]
Valentincic et al.

[11] Patent Number: 5,185,164
[45] Date of Patent: Feb. 9, 1993

[54] BAIT WHICH CONTAIN AMINO ACIDS FOR CATCHING ICTALURID CATFISH

[75] Inventors: Tine B. Valentincic, Slovenija, Yugoslavia; John T. Caprio, Baton Rouge, La.

[73] Assignee: Board of Supervisors, Louisiana State University, Baton Rouge, La.

[21] Appl. No.: 796,029

[22] Filed: Nov. 22, 1991

Related U.S. Application Data

[63] Continuation-in-part of Ser. No. 742,361, Aug. 8, 1991, which is a continuation-in-part of Ser. No. 575,993, Aug. 31, 1990, abandoned.

[51] Int. Cl.$^5$ ............................................. A23K 1/18
[52] U.S. Cl. ............................................. 426/1; 426/805
[58] Field of Search ............... 424/84; 514/423, 561, 514/565; 426/2, 805, 1

[56] References Cited

U.S. PATENT DOCUMENTS

| | | | |
|---|---|---|---|
| 3,988,466 | 10/1976 | Takagi et al. | 514/561 |
| 4,693,897 | 9/1987 | Johnsen et al. | 426/1 |
| 4,704,286 | 11/1987 | Rittschof et al. | 426/1 |
| 4,752,480 | 6/1988 | Charbonnier et al. | 426/1 |
| 4,826,691 | 5/1989 | Prochnow | 426/1 |

OTHER PUBLICATIONS

Journal of Comparitive Physiology, "An Electrophysiological . . . ", 150:345-357 (1983) (Caprio I).
Comparative Biochem. Physio., "High Sensitivity of Catfish Tests . . . " vol. 52A, pp. 247-251 (1975) (Caprio II).
Chemo Reception in Fishes, "High Sensitivity . . . "Chapter 7 pp. 109-134 (1982) (Caprio III).

Primary Examiner—Marianne M. Cintins
Assistant Examiner—John Peabody
Attorney, Agent, or Firm—William D. Kiesel; Robert C. Tucker

[57] ABSTRACT

A bait for catching Ictalurid catfish, and fish with similar feeding behavior, containing the free amino acids: L-proline, L-alanine, and L-arginine, and mixtures thereof, at concentrations above those normally found around fish's natural foods is provided to increase the likelihood of snapping or biting of the bait or lure by the fish.

4 Claims, 5 Drawing Sheets

L-PROLINE CONCENTRATION AND NUMBER OF BITES IN ANOSMIC CATFISH

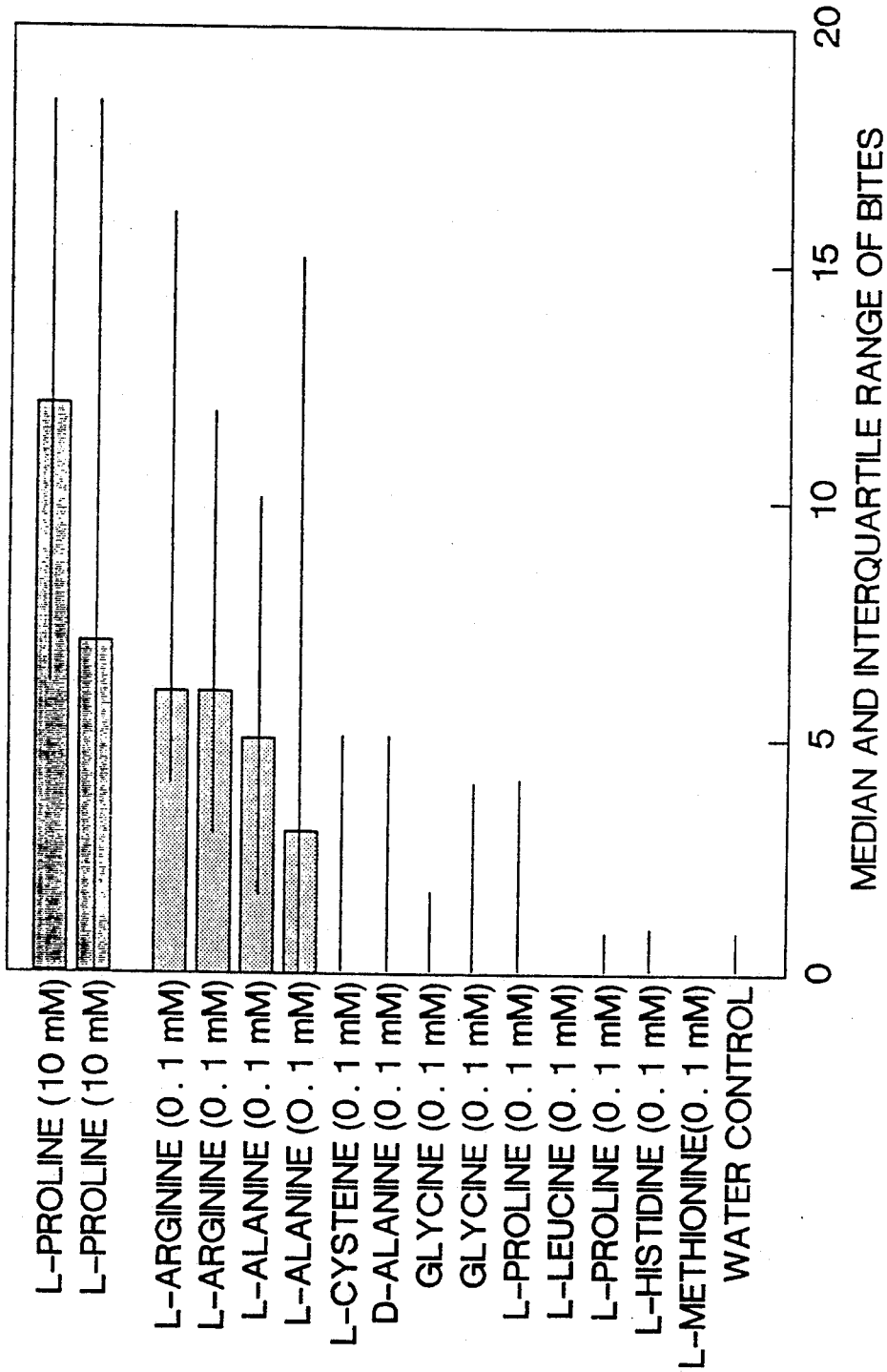

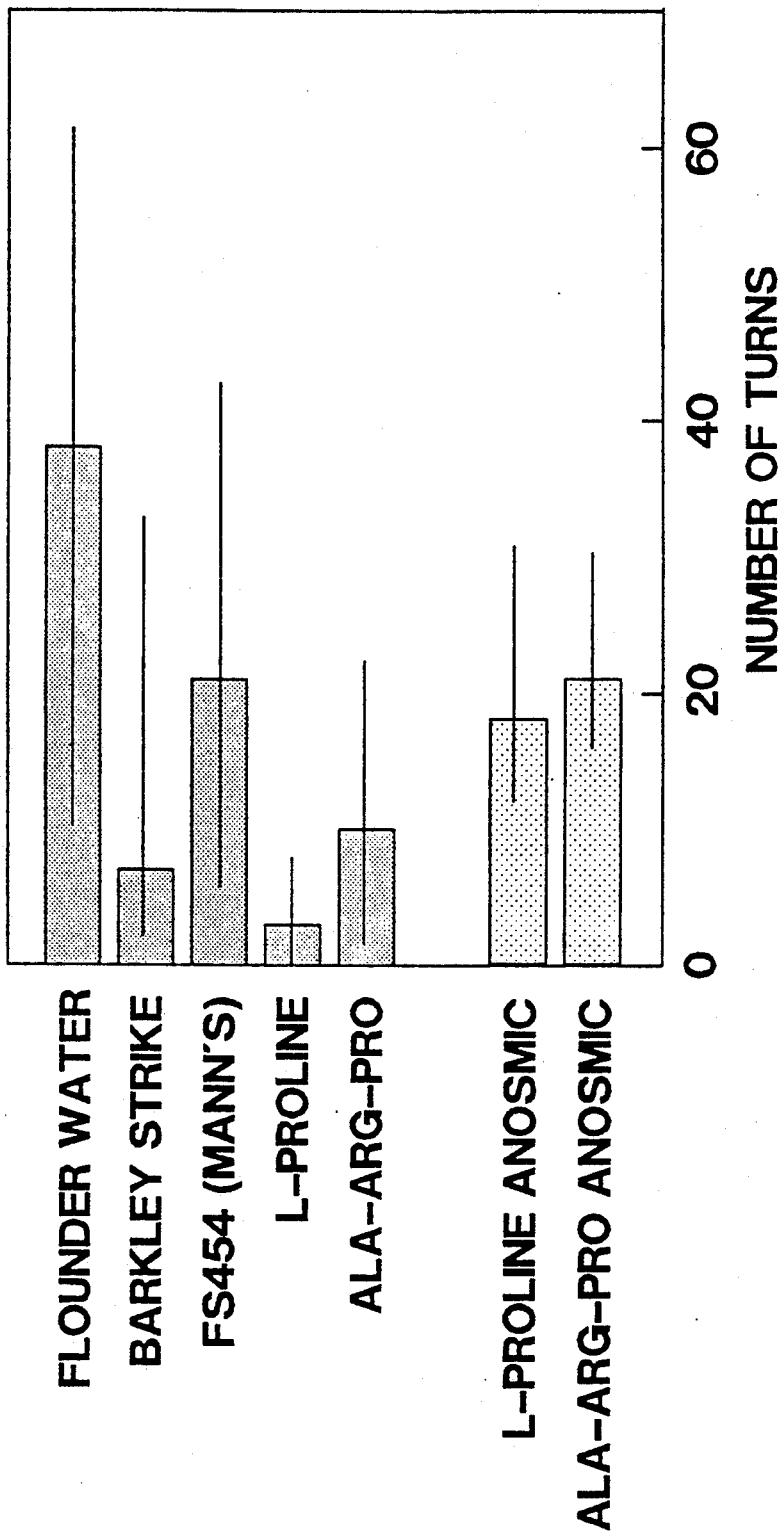

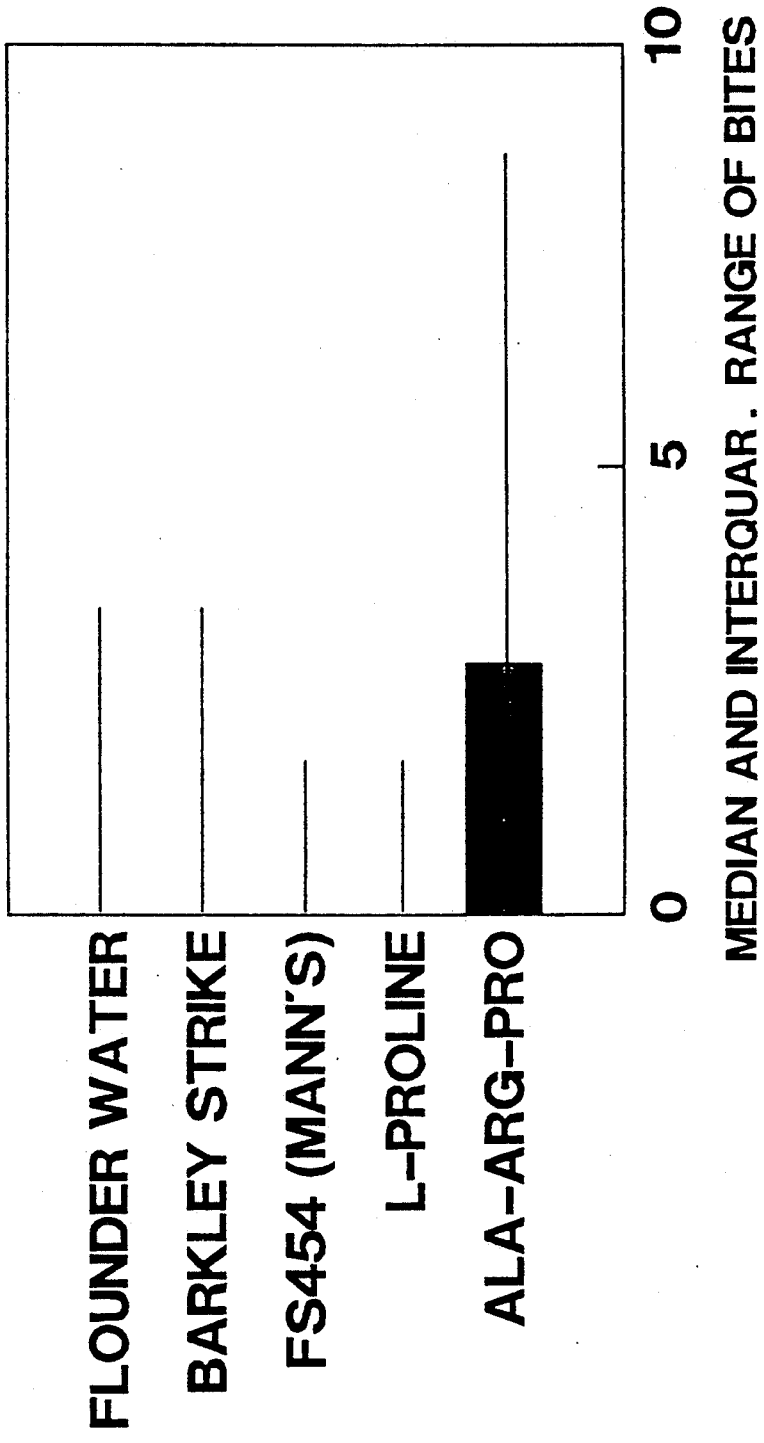

BAIT WHICH CONTAIN AMINO ACIDS FOR CATCHING ICTALURID CATFISH

This is a continuation-in-part of copending application Ser. No. 07/742,361 filed on Aug. 8, 1991, which is a continuation-inpart of application Ser. No. 07/575,983 filed on Aug. 31, 1990, now abandoned.

FIELD OF THE INVENTION

This invention relates to the incorporation of the free amino acids: L- proline, L-alanine, L-arginine, and mixtures thereof, with a fishing lure or bait to release snapping and biting at the fishing lure or bait by ictalurid catfish, and fish having similar feeding behavior. More particularly, the invention relates to fishing lures or baits wherein the amino acids are incorporated into the fishing bait or lure so that in water, they are present around the fishing lure or bait so that in water the amino acids diffuse out of the fishing lure or bait at concentrations above those which are normally found around the fish's normal or natural foods.

BACKGROUND OF THE INVENTION

The feeding behavior of fish consists of two phases: (1) an appetitive phase which includes an orienting response and a food search response, and (2) a consummatory phase which includes a snapping/biting response, masticating, and a swallowing response. The discovery of an agent that stimulates the biting response of fish without inhibiting the other feeding behavior responses would be of value to sport and commercial fishermen in catching these fish.

In most fish, including members of the ictalurid family, such as channel catfish (Ictalurus punctatus), the chemical stimuli in the environment are detected by both their olfactory and gustatory receptors. Neurophysiological studies have shown that both the olfactory and the gustatory receptors of most fish, including ictalurid catfish, are sensitive to amino acids, such as those found in the natural substances on which fish feed (e.g., tissues of worms, mollusks, crustaceans, insects, amphibians, and teleosts).

Much work has been done in associating various amino acids with both gustatory and olfactory receptors in fish, particularly ictalurid catfish. See for example: "High Sensitivity of Catfish Taste Receptors to Amino Acids", by John Caprio, *Comparative Biochemical Physiology*, 1975, Vol. 52A, pp 247-251; "High Sensitivity and Specificity of Olfactory and Gustatory Receptors of Catfish to Amino Acids", by John Caprio, *Chemoreception in Fishes*, Elsevier Scientific Publishing Co., Amsterdam, 1982, Chapter 7, pp 109-1241; "An Electrophysiological Investigation of the Oro-Pharyngeal (IX-X) Taste System in the Channel Catfish, Ictalurus punctatus", by J.S. Kanwal and J. Caprio, *Journal of Comparative Physiology*, vol.150, 1983, pp 345-357; and "Receptor Sites For Amino Acids in the Facial Taste System of the Channel Catfish", by S. Wegert and J. Caprio, *Journal of Comparative Physiology A*. vol. 168, 1991, pp 201-211. While much work has been reported in the above articles, as well as others not listed above, with regard to the sensitivity of various gustatory and olfactory receptors to the amino acids, all of this work was from electrophysiological studies—not behavioral studies. That is, while experiments can be conducted to show that various receptors of a fish are sensitive to a particular agent, they cannot predict the behavior which will be associated with that particular agent. For example, it has been observed that a particular amino acid may either attract or repel fish, or even cause no behavior response, depending upon other past or present stimulations to the fish.

Even in those cases where fish have been attracted by the presence of certain compounds, the attraction has not been consistently followed by an increase in the feeding activity of the fish. Also, while a gustatory receptor may be equally sensitive to one stimulus which is sweet in taste, and another which is bitter or salty in taste, the behavior of the animal can be the opposite for each stimulus. In fact, of the three amino acids of the present invention for releasing the snapping/biting response, one, at least to humans, is very bitter (L-arginine) and another is sweet (L-alanine). Consequently, the fact that a particular agent can trigger an electrophysiological response in a receptor of a fish, it does not predict the corresponding behavior the fish will have to that agent.

While various attempts have been made to incorporate various chemical compounds into fishing baits or lures to increase the likelihood that a particular fish species will bite or snap at the hooks in the bait or lure, there still exists a substantial need in the art for improved fishing lures and baits which incorporate such biting and snapping enhancers.

SUMMARY OF THE INVENTION

Therefore, it is an object of the present invention to provide an agent that can release the snapping/biting response of fish, particularly ictalurid catfish, and other fish having similar feeding behavior that can be incorporated into a fishing lure or bait.

Other objects and advantages of this invention will become apparent from the ensuing descriptions of this invention.

In accordance with the present invention, there is provided an improved fishing lure or bait for causing ictalurid catfish, and fish with similar feeding behavior, to snap or bite the fishing lure or bait, the improvement which comprises the incorporation in the fishing lure or bait of an effective amount of: (a) one or more of the free amino acids: L-alanine, L-arginine, L-proline or mixture thereof; wherein the effective amount is an amount which will release the snapping and biting response of the fish.

In a preferred embodiment of the present invention, an effective amount of said free amino acids in the fishing lure or bait would be at least that amount, which when placed in water, would result in plumes having a molar concentration of at least about 0.001M for L-alanine and L-proline, and at least about 0.0001M for L-arginine.

In another preferred embodiment of the present invention, the body of the fishing lure or bait will be constructed from material which is substantially odorless and tasteless, and which more preferably will be a dark color, such as various shades of brown, or black.

In a further preferred embodiment of the present invention, the body of the fishing lure or bait will be constructed at least in part of a material that is soaked in a liquid solution of the free amino acids, and allow their diffusion into a pond, stream, or lake water during fishing.

BRIEF DESCRIPTION OF THE DRAWINGS

FIG. 3 is a graphic representation of the results obtained in Example 3 hereof which was also conducted in accordance with the procedure of Example 1, except that various other amino acids were used.

FIG. 4 is a graphic representation of the results obtained in Example 4 hereof wherein the swimming response was determined for naive anosmic ictalurid catfish to various attractants, including the amino acids of the present invention which indicates the sensory system affected is taste.

FIG. 5 hereof is a graphic representation of the results obtained in Example 5 hereof wherein the biting behavior of naive ictalurid catfish were determined for various attractants.

PREFERRED EMBODIMENTS OF THE INVENTION

Figure 1:
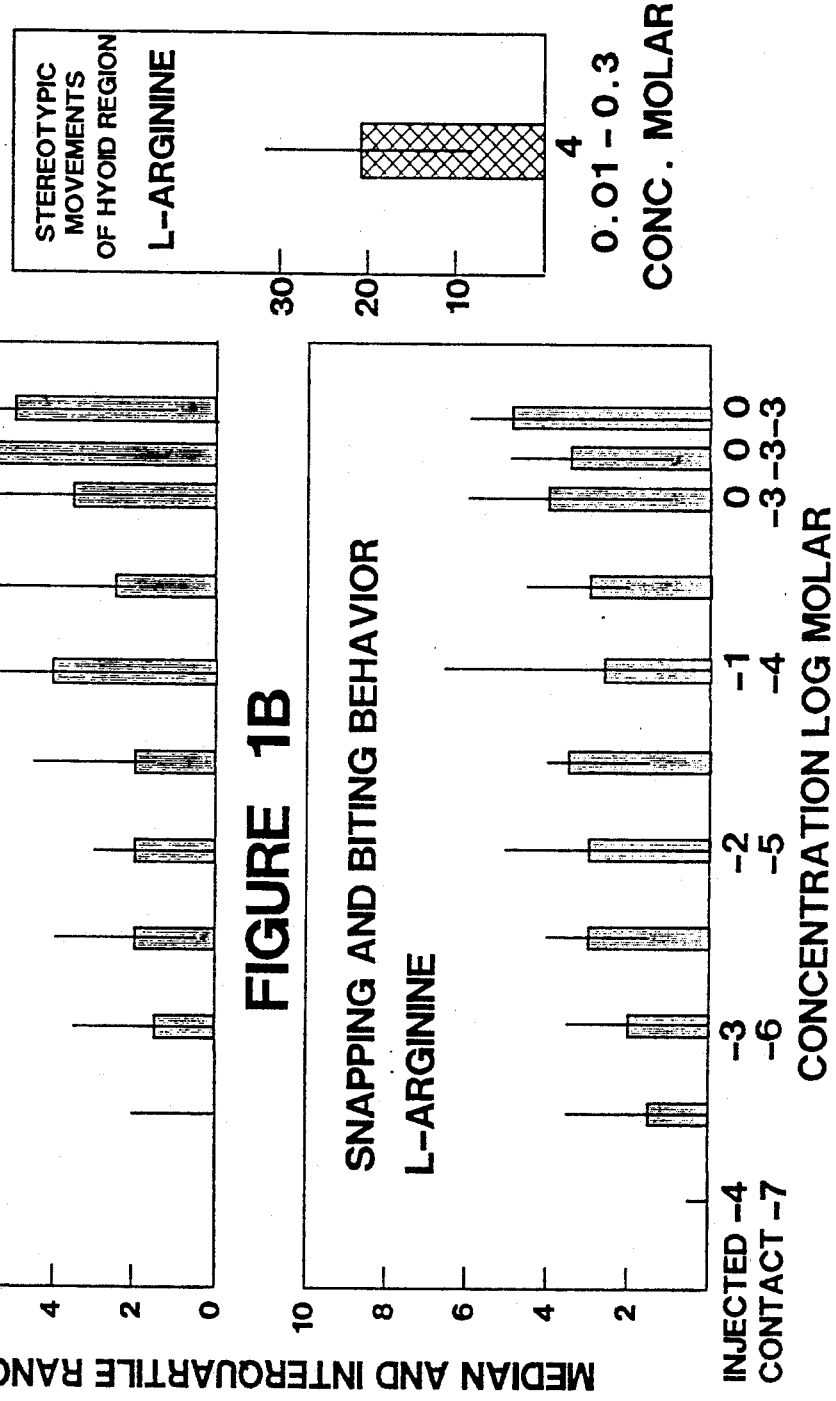
FIGS. 1A, 1B, and 1C are graphic representations of the results obtained in Example 1 hereof wherein the snapping and biting behavior of anosmic ictalurid catfish were investigated as a function of concentration of L-alanine and L-arginine.

It has now been found, by the inventors hereof, that the initial responses of the consummatory phase of the feeding behavior (i.e. the biting or snapping response) in ictalurid catfish can be released by one or more of the following free amino acids at supranatural concentrations: L- proline, L-alanine, and L-arginine. By the term, "supranatural concentrations", we mean that any one or more the three amino acids must be present in concentrations greater than those which normally come from the natural food of the fish and which are found in the water around the food. Typically, the concentrations of these amino acids around the natural food of ictalurid catfish do not exceed about 0.001M. By the practice of the present invention, additional amounts of one or more of the three amino acids are added in an effective amount. The term "effective amount" means that enough of the amino acids is added such that when the fishing lure or bait incorporated with the amino acids is placed in water, stimulus plumes are formed which are comprised of an aqueous solution of stimuli, which are the one or more free amino acids: L-alanine, L-arginine, and L-proline. The molar concentrations of these plumes will be at least about 0.001M for L-alanine and L-proline, and at least about 0.0001M for L-arginine. The upper limit for the molarity of the plumes will be governed by the solubility limit for L-alanine and L-proline. The solubility limit for L-proline is about 15M, and for L-alanine about 2M. The upper limit for L-arginine will be determined by its inhibitory effects on the snapping and biting response at higher concentrations. For example, at contact concentrations of greater than about 0.1M, L-arginine causes stereotypic hyoid movements, which inhibit feeding.

These same amino acids are expected to control the biting behavior in other fish species, such as cyprinid and scienid fish, that have similar feeding behavior as the ictalurids. By "similar feeding behavior" we mean a fish whose intake of food (the turning and biting at food) is primarily controlled by chemosensory receptors of the fish.

When the fishing lure or bait incorporating the amino acids of the present invention is introduced into the water containing the fish, the amino acids begin to diffuse and become distributed within the body of water. The distribution of a soluble substance emanating from a point source in water is not homogeneous, nor is it a simple gradient. The diffusion gradients are established at distances up to a few millimeters away from the stimulus source. The stimulus is carried away from the source by micro-currents in the form of stimulus plumes contained in single water eddies. That is, if one were to measure the concentration of the dissolved substance at set distances from its point source as a function of time, the reading would uncover peaks of higher concentration of the delivered chemical at various distances. See "High Resolution Spatiotemporal Analysis of Aquatic Chemical Signals Using Microelectrochemical Electrodes", by P.A. Moore et al., *Chemical Senses*, 14(6):829–840, 1989, and which is incorporated herein by reference.

Any of the three free amino acids: L-alanine, L-arginine and L- proline, can be incorporated into the fishing lure or bait alone, or in any combination thereof, to release snapping and biting in ictalurid catfish. L- arginine is the most effective stimulus at low concentrations, but does not show concentration dependence at higher concentrations. L-proline and L-alanine are more effective at the higher concentrations at releasing the snapping and biting response than is L-arginine. Thus, if the three amino acids are used as a mixture, they complement one another across the concentration scale. L-proline has the strongest concentration dependence of the three amino acids, and thus at higher concentrations it alone releases most of the biting or snapping response. In addition, all three amino acids release searching responses; however, at low concentrations, L- arginine and L-alanine are more effective at releasing this behavior than L-proline. Thus, their inclusion in the mixture increases the chances that the fish will approach the fishing lure or bait. Once the fish is in the vicinity of the fishing lure or bait, the amino acids of the present invention will cause the fish to snap and bite the fishing lure or bait.

Any suitable method can be used for incorporating the amino acids into the fishing lure or bait. For example, the amino acids, in crystalline form, can be added directly into a cavity contained in the body of the fishing lure or bait. In this form the amino acids must be able to contact the water in the stream, lake or pond that is being fished. This can be achieved by closing the cavity with a water permeable membrane that will allow the dissolved amino acid crystals to dissipate into the water in effective amounts. For an existing fishing lure or bait, an aqueous solution, preferably saturated, of the amino acids, or a precursor thereof, can be soaked or otherwise applied to the fishing lure or bait just prior to the fishing lure or bait being placed in the water to be fished. The construction of such fishing lures and baits are known to those skilled in the art of making lures.

In one preferred embodiment the body of the fishing lure or bait will be constructed of materials which are odorless and tasteless. More preferably, the material will be of a dark color, such as various shades of brown, or black. If no special cavity is provided in the body of the fishing lure or bait, then it preferred that at least a part of the fishing lure or bait be constructed of material which will soak up the solution amino acids when they have been dissolved in water and which will allow the amino acids to diffuse into the water being fished upon the submergence of the fishing lure or bait. A preferred example of such absorbent material would include sponges, and sponge-like materials.

The following examples are presented to illustrate various aspects of the present invention and are not to be taken as being limiting in any way.

EXAMPLE 1

The biting behavior of anosmic ictalurid catfish to the free amino acids L-alanine and L-arginine at 9 different concentrations was investigated. The example was conducted by taking ictalurid catfish and making them anosmic (removing their olfactory receptors) by an appropriate surgical procedure under anesthetic conditions. Each fish was kept in an aquarium containing black gravel to avoid an "escape excitatory state". Each fish was fed daily with fresh fish meat until total recovery of their surgical wounds. The catfish were presented with 1ml of solution of the tested amino acid from hydraulically operated Pasteur pipettes and the behavioral responses were video-recorded. The number of bites (snaps) and movements of the hyoid region of the fish were counted from slow motion frame by frame replay. The resulting data are presented as median results and interquartile range in FIGS. 1A, 1B, and 1C hereof. By interquartile range is meant that $\frac{1}{4}$ of the results were lower and $\frac{1}{4}$ of the results were larger than the range presented in the bars of the figure.

EXAMPLE 2

Figure 2:
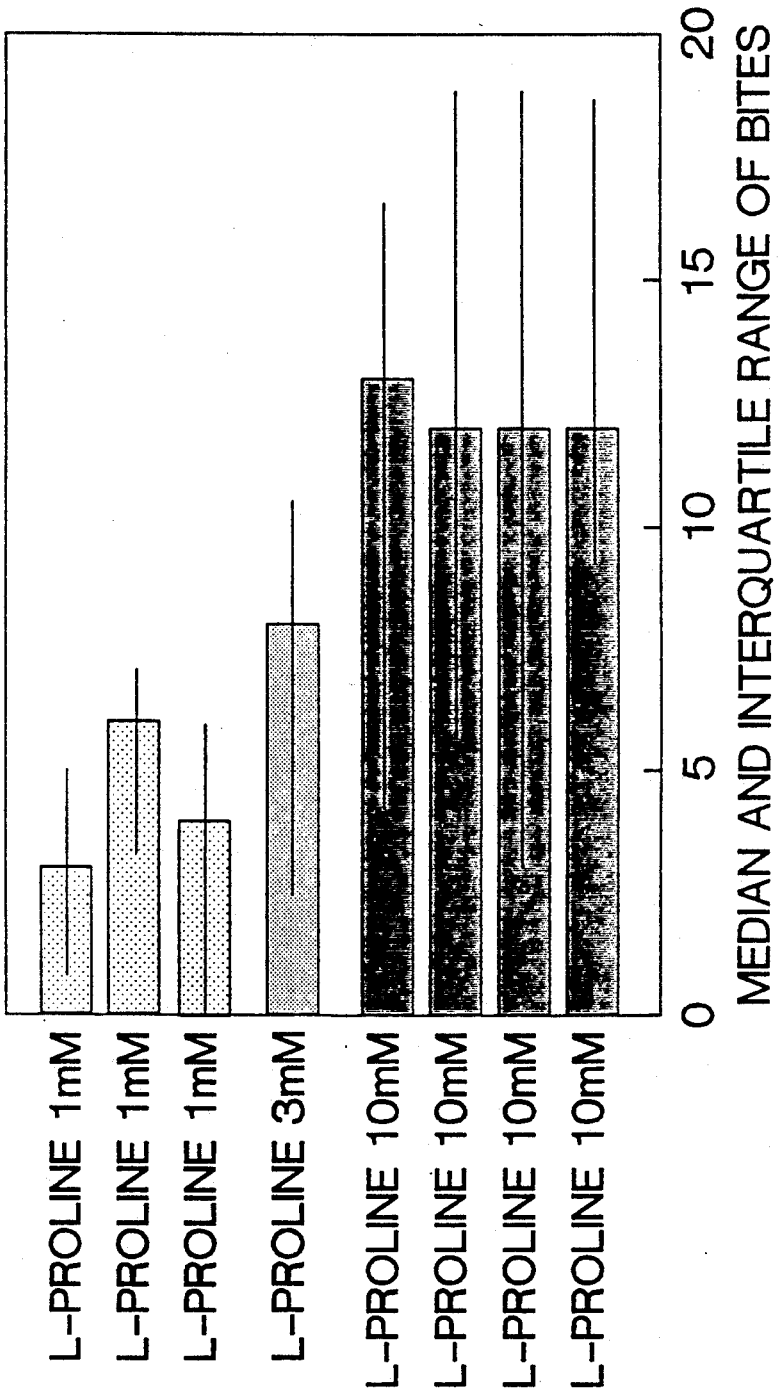
FIG. 2 is a graphic representation of the results obtained in Example 2 hereof, which was conducted in accordance with the procedure of Example 1, but using different concentrations of L-proline.

The above procedure was followed except that L-proline was used instead of L-alanine and L-arginine. The results of this example are shown in FIG. 2 hereof.

EXAMPLE 3

The procedure of Example 1 was followed except that various other amino acids were used along with the three of the present invention. The results are presented in FIG. 3 hereof.

EXAMPLE 4

The swimming responses of naive ictalurid catfish of L-proline, a combination of the three amino acids of the present invention, and some commercial attractants was tested. The naive catfish had no previous experience with the tested compounds. Intact catfish were, for these experiments, maintained individually in black gravel aquaria and regularly fed flounder meat until the beginning of the experiments of this example. The swimming response presented is the quantity of swimming measured in terms of turns greater than 90 degrees in a rectangular aquaria. The response to flounder water is a response to water in which slices of flounder meat were stirred for 10 minutes. For comparison, conditioned responses to single chemicals have medians from 40 to 70 turns in 90 seconds and frightened fish would not swim to the chemical stimulation at all and the medians and the upper quartiles would be 0. The swimming behavior acts to bring fish close to the stimulation source. The fish tend to swim more to chemical stimuli which are familiar to them from previous experience than to stimuli presented for the first time. The results are graphically shown in FIG. 4 hereof.

EXAMPLE 5

The biting behavior of iotalurid catfish to L-proline, a combination of all three of the amino acids of the present invention, flounder water, and to various commercial attractants was tested. The naive catfish were maintained for 2 months in the test aquaria and with no previous experience with the tested material. The catfish were presented with 1 ml of solution of the tested material from hydraulically operated Pasteur pipettes. The solutions were prepared as follows: flounder water was water in which slices of flounder meat were maintained for 10 minutes; an undiluted solution of Berkeley Strike For Catfish was injected into aquaria, and a saturated water solution of Mann's FS 454 was prepared by shaking water in glass containers coated with the FS paste. The mixture of the amino acids of the present invention was 0.5M L-proline, 0.1M L-alanine, and 0.1M L-arginine; and the L- proline used alone was 1M. The biting behavior of the catfish is an innate response which is not modified by experience; however, this response can also be inhibited by any stimulus which frightens the fish. The results were obtained by video recording, as in Example 1 hereof, and are graphically represented in FIG. 5 hereof.

There are of course other alternate embodiments which are obvious from the foregoing descriptions of the invention which are intended to be included within the scope of the invention as defined by the following claims.

What is claimed is:

1. An improved ictalurid catfish bait to catch ictalurid catfish, which bait contains an effective amount of: (a) one or more of the free amino acids selected from the group consisting of L-alanine, L-arginine, L-proline, or mixtures thereof; wherein said effective amount is an amount which will release the snapping and biting response of said fish.

2. The catfish bait of claim 1 wherein all three of the free amino acids is present.

3. The catfish bait of claim 1 wherein the one or more free amino acids is present in an amount which will produce, when placed in a body of water, plumes having a concentration of one or more of: at least about 0.001M L-alanine, at least about 0.001M L-proline, and at least about 0.0001M L-arginine.

4. The catfish bait of claim 3 wherein all three of said free amino acids are present.

* * * * *

UNITED STATES PATENT AND TRADEMARK OFFICE
CERTIFICATE OF CORRECTION

PATENT NO. : 5,185,164
APPLICATION NO. : 07/796029
DATED : February 9, 1993
INVENTOR(S) : Valentincic et al.

Page 1 of 1

It is certified that error appears in the above-identified patent and that said Letters Patent is hereby corrected as shown below:

In the specification, Column 1, Line 9, add new paragraph, as second paragraph of the specification
--Part of the work during the development of this invention was made with government support under Grant Number BNS 8819772 awarded by the National Science Foundation and under Grant Number NO0014-90-J-1583 awarded by the Office of Naval Research. The U.S. Government has certain rights in the invention--.

Signed and Sealed this

Eighth Day of May, 2007

JON W. DUDAS
*Director of the United States Patent and Trademark Office*